US010678987B2

(12) United States Patent
Chen et al.

(10) Patent No.: US 10,678,987 B2
(45) Date of Patent: Jun. 9, 2020

(54) CELL LAYOUT METHOD AND SYSTEM FOR CREATING STACKED 3D INTEGRATED CIRCUIT HAVING TWO TIERS

(71) Applicant: TAIWAN SEMICONDUCTOR MANUFACTURING COMPANY LTD., Hsinchu (TW)

(72) Inventors: Sheng-Hsiung Chen, Hsinchu County (TW); Fong-Yuan Chang, Hsinchu County (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 114 days.

(21) Appl. No.: 15/793,413

(22) Filed: Oct. 25, 2017

(65) Prior Publication Data

US 2019/0121929 A1    Apr. 25, 2019

(51) Int. Cl.
*G06F 30/30*      (2020.01)
*G06F 30/392*    (2020.01)
*G06F 30/39*      (2020.01)
*G06F 111/20*    (2020.01)

(52) U.S. Cl.
CPC ............ *G06F 30/392* (2020.01); *G06F 30/39* (2020.01); *G06F 2111/20* (2020.01)

(58) Field of Classification Search
CPC ............. G06F 17/5072; G06F 17/5068; G06F 2217/02; G06F 30/392; G06F 30/39; G06F 2111/20
See application file for complete search history.

(56) References Cited

U.S. PATENT DOCUMENTS

| | | | | |
|---|---|---|---|---|
| 7,653,884 B2* | 1/2010 | Furnish | ............... | G06F 17/5068 716/103 |
| 8,710,671 B2* | 4/2014 | Bobba | ................. | H01L 27/0203 257/737 |
| 8,726,220 B2* | 5/2014 | Lin | ..................... | G06F 17/5081 716/135 |
| 9,355,205 B2* | 5/2016 | Chang | ................. | G06F 17/5072 |
| 9,922,151 B2* | 3/2018 | Sarhan | ................ | G06F 17/5045 |
| 10,318,694 B2* | 6/2019 | Chung | ............... | G06F 17/5077 |

(Continued)

OTHER PUBLICATIONS

Jingwei et al.; "ePlace-3D: Electrostatics based Placement for 3D-ICs"; ISPD '16; Apr. 3-6, 2016; Santa Rosa, California, USA; pp. 1-8.*

*Primary Examiner* — Naum Levin
(74) *Attorney, Agent, or Firm* — WPAT, P.C., Intellectual Property Attorneys; Anthony King (57) ABSTRACT

A method is disclosed. The method includes: obtaining a circuit design including a plurality of 2D cells of a 2D cell library; partitioning the plurality of 2D cells of the circuit design into a first group assigned to a first tier and a second group assigned to a second tier; swapping the 2D cells assigned to the first tier with corresponding 3D cells of a first type 3D cell library respectively; and swapping the 2D cells assigned to the second tier with corresponding 3D cells of a second type 3D cell library respectively; wherein at least one of the obtaining, partitioning, and swapping is performed using a processor. An associated system is also disclosed.

20 Claims, 9 Drawing Sheets

(56) References Cited

U.S. PATENT DOCUMENTS

| | | | |
|---|---|---|---|
| 2012/0038057 A1* | 2/2012 | Bartley | H01L 23/3677 257/774 |
| 2015/0112646 A1* | 4/2015 | Kamal | G06F 17/5068 703/1 |
| 2016/0140276 A1* | 5/2016 | Sarhan | G06F 17/5045 716/103 |
| 2018/0104947 A1* | 4/2018 | Poulikakos | B41J 2/145 |
| 2018/0314783 A1* | 11/2018 | Moroz | G06F 17/5081 |
| 2019/0012420 A1* | 1/2019 | Berhault | G06F 17/5072 |
| 2019/0050519 A1* | 2/2019 | Dai | G06F 17/5081 |

* cited by examiner

CELL LAYOUT METHOD AND SYSTEM FOR CREATING STACKED 3D INTEGRATED CIRCUIT HAVING TWO TIERS

BACKGROUND

Since the invention of the integrated circuit, the semiconductor industry has continuously sought to improve the density of integrated circuit components (transistors, diodes, resistors, capacitors, etc.). For the most part, improvements in density have come from reductions in feature size, allowing more components to be formed within a given area. These improvements have been made while components remain in an essentially two-dimensional layout. Although dramatic increases in density have been realized within the limits of a two-dimensional layout, further improvements are difficult to achieve.

Three-dimensional integrated circuits (3D ICs) have been created to overcome these limitations. In a 3D IC, two or more semiconductor bodies, each including an integrated circuit, are formed, aligned vertically, and bonded together.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

Three dimensional (3D) integrated circuits (IC) can be formed by vertically stacking at least two chips and providing power and signal communication connections between the chips using TSVs. Each chip is called a tier of the 3D IC. Alternatively, the 3D IC can be constructed using a single semiconductor wafer, with integrated components arranged in three dimensions. In a single-substrate 3D IC (such as a stacked CMOS 3D IC), components are also arranged into tiers, each tier having a plurality of layers. Each tier has a respective interconnect structure, and optionally has a respective active device layer. A respective insulating layer or semiconductor layer is provided between each successive pair of adjacent tiers. If the second or subsequent tier of the 3D IC has an active device layer, a semiconductor layer is provided at the bottom of that tier. For example, in some embodiments, a thin semiconductor substrate is bonded over the top interconnect layer (e.g., top metal line layer) of the adjacent underlying tier. In some embodiments, the stacked CMOS 3D IC has two tiers. The first tier includes the semiconductor substrate with active devices thereon, and an interconnect structure including conductive line layers and conductive via layers. A thin semiconductor substrate can be directly bonded over the top conductive line layer of the first tier. Active devices (e.g., transistors, diodes MOS capacitors and varactors) are formed in thin semiconductor substrate of the second tier. A second tier interconnect structure is formed over the thin semiconductor substrate of the second tier. The second tier interconnect structure includes second tier conductive line layers and second tier conductive via layers.

As mentioned above, the 3D IC can be a stacked CMOS 3D IC, a single-substrate 3D IC, or a stacked-die 3D IC, for example. During the fabrication of the 3D IC, each tier is fabricated separately. The present disclosure provides methods and a system for placement of cells of the 3D IC. Specifically, the present disclosure provides placement methods and a system that take cells of different tiers as a whole into overall consideration. In this way, during the place and route operations, a cell's location may be changed from one tier to another, or cells at different tiers may be interchangeable.

Figure 1:
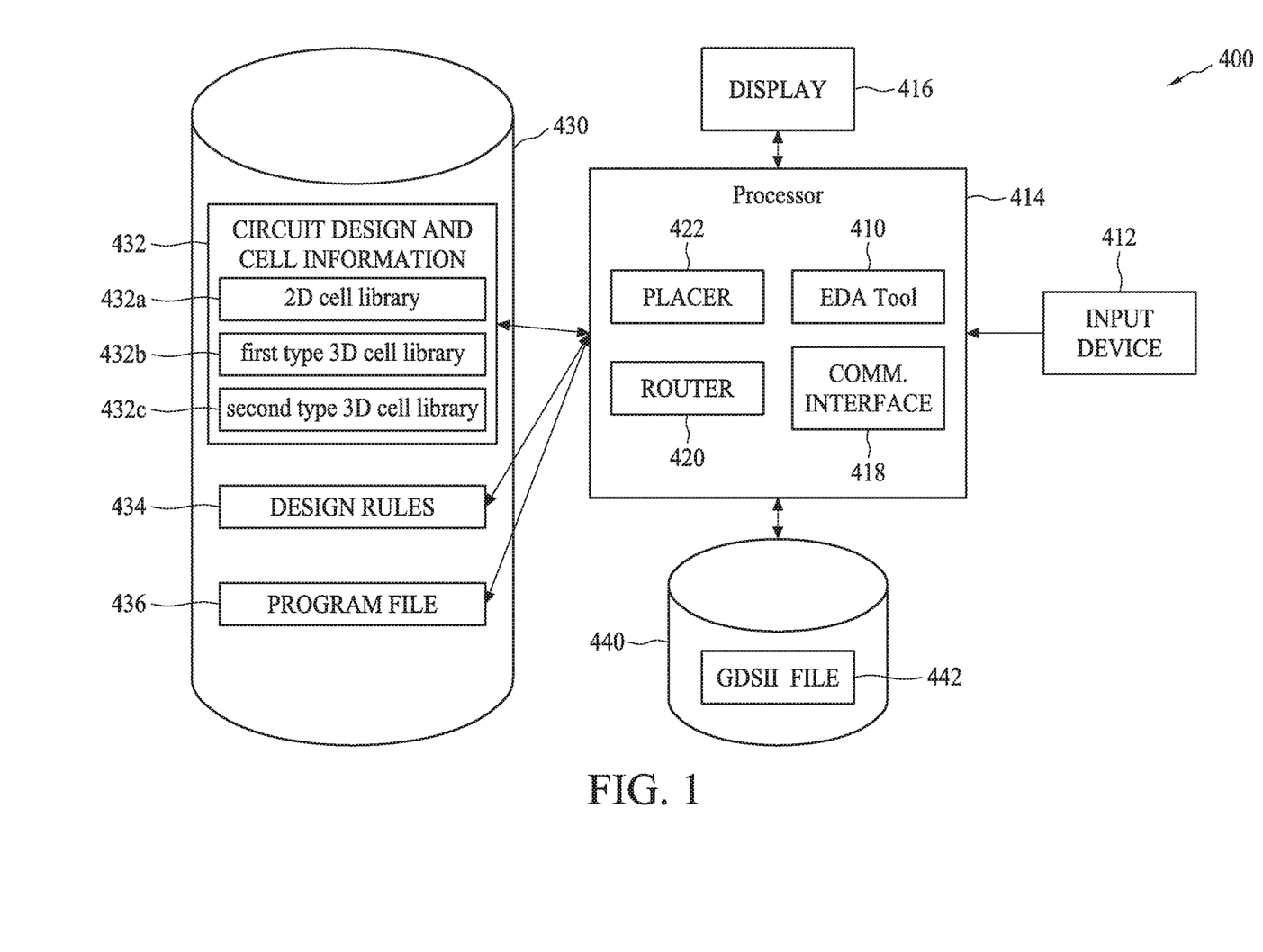
FIG. 1 is a block diagram of one example of a system in accordance with some embodiments of the present disclosure.

FIG. 1 is a block diagram of one example of a system in accordance with some embodiments of the present disclosure. In some embodiments, a system 400 includes a display 416 and a user interface or input device 412 such as, for example, a mouse, a touch screen, a microphone, a trackball, a keyboard, or other device through which a user may input design and layout instructions to the system 400. The one or more computer readable storage mediums 430, 440 store data input by a user such as a circuit design and/or cell information 432 such as, for example, a 2D cell library 432a, 3D cell libraries 432b and 432c, design rules 434, one or more program files 436, and one or more graphical data system ("GDS") II files 442. In the ASIC flow, cell libraries include cells with different logic functions. Cells are placed at specific locations to meet timing and area requirements. The cell may include, for instance, AND cells, OR cells, NAND cells, NOR cells, flip flop cells, XOR cells, INV cells, etc. In the exemplary embodiment, each cell of the 2D cell library 432a corresponding to a cell in the 3D cell library 432b and a cell in the 3D cell library 432c.

In some embodiments, a designer may use an electronic design automation ("FDA") tool 410 of the system 400 to create an integrated circuit. The EDA tool 410 may be such as "IC COMPILER"™, sold by Synopsys, Inc. of Mountain View, Calif., having an APR tool including a router 420 such as "ZROUTE"™, also sold by Synopsys. Other EDA tools 410 may be used, such as, for example, the "VIRTUOSO" custom design platform or the Cadence "ENCOUNTER"® digital IC design platform along with the "VIRTUOSO" chip assembly router 420, all sold by Cadence Design Systems, Inc. of San Jose, Calif., and a placer 422.

The EDA tool 410 is a special purpose computer formed by retrieving stored program files 436 from the computer readable storage medium 430, 440 and executing the instructions on a general purpose processor 414. The processor 414 may be any central processing unit ("CPU"), microprocessor, micro-controller, or computational device or circuit for executing instructions. The non-transient machine readable storage medium 430, 440 may be a flash memory, random access memory ("RAM"), read only memory ("ROM"), or other storage medium. Examples of RAMs include, but are not limited to, static RAM ("SRAM") and dynamic RAM ("DRAM"). ROMs include, but are not limited to, programmable ROM ("PROM"), electrically programmable ROM ("EPROM"), and electrically erasable programmable ROM ("EEPROM"), to name a few possibilities.

In some embodiments, the system 400 includes a communication interface 418 allowing software and data to be transferred between the EDA tool 410 and external devices. Examples of the communications interface 418 include, but are not limited to, a modem, an Ethernet card, a wireless network card, a Personal Computer Memory Card International Association ("PCMCIA") slot and card, or the like. In some embodiments, software and data transferred via the communications interface 418 is in the form of signals such as, for example, electronic, electromagnetic, optical, or the like that are capable of being received by the communications interface 418. These signals are provided to the communications interface 418 via a communications path (e.g., a channel), which, in some embodiments, is implemented using wire, cable, fiber optics, a telephone line, a cellular link, a radio frequency ("RF") link and other communication channels.

Figure 2:
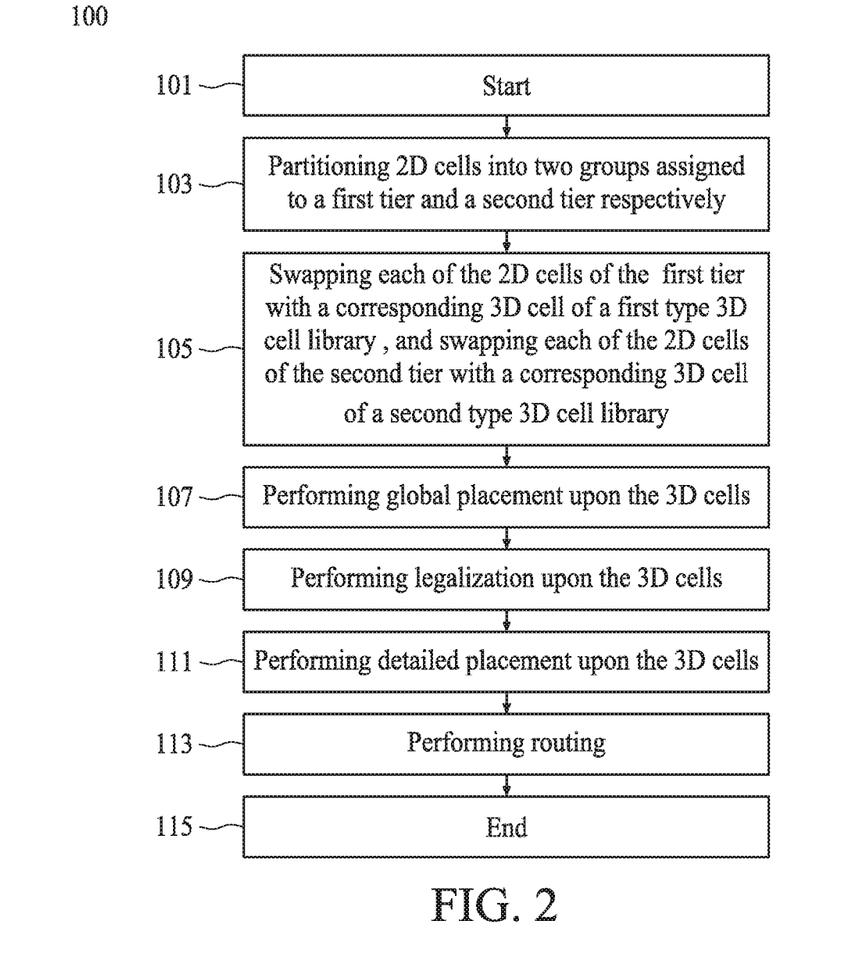
FIG. 2 is a flow diagram illustrating selected details of placing and routing any portion of a 3D IC according to an embodiment of the present disclosure.

FIG. 2 is a flow diagram illustrating selected details of placing and routing any portion of a 3D IC according to an embodiment of the present disclosure. Processing begins ("Start" 101), in certain embodiments by receiving the circuit design and/or cell information 432, the design rules 434 and one or more program files 436 from the computer readable storage medium 430. The circuit design and/or cell information 432 may include a netlist including 2D cells from the 2D cell library 432a.

The 2D cells of the netlist are then partitioned into two groups assigned to a first tier and a second tier respectively (103) at least by the processor 414. Partitioning the 2D cells of the netlist is required when porting a circuit design from a 2D technology to a 3D technology having N tiers, where N may be any integer greater than 1 in order to reduce the IC area. Efficient partitioning and placement of circuits in each tier determines how closely the design approaches the ideal shrinkage. In the exemplary embodiments, a 3D technology having two tiers, i.e. N=2, is used for illustrative purpose, and it is not a limitation of the present disclosure. Please note that the partitioning operation is not limited to any specific method in the present disclosure.

Figure 3:
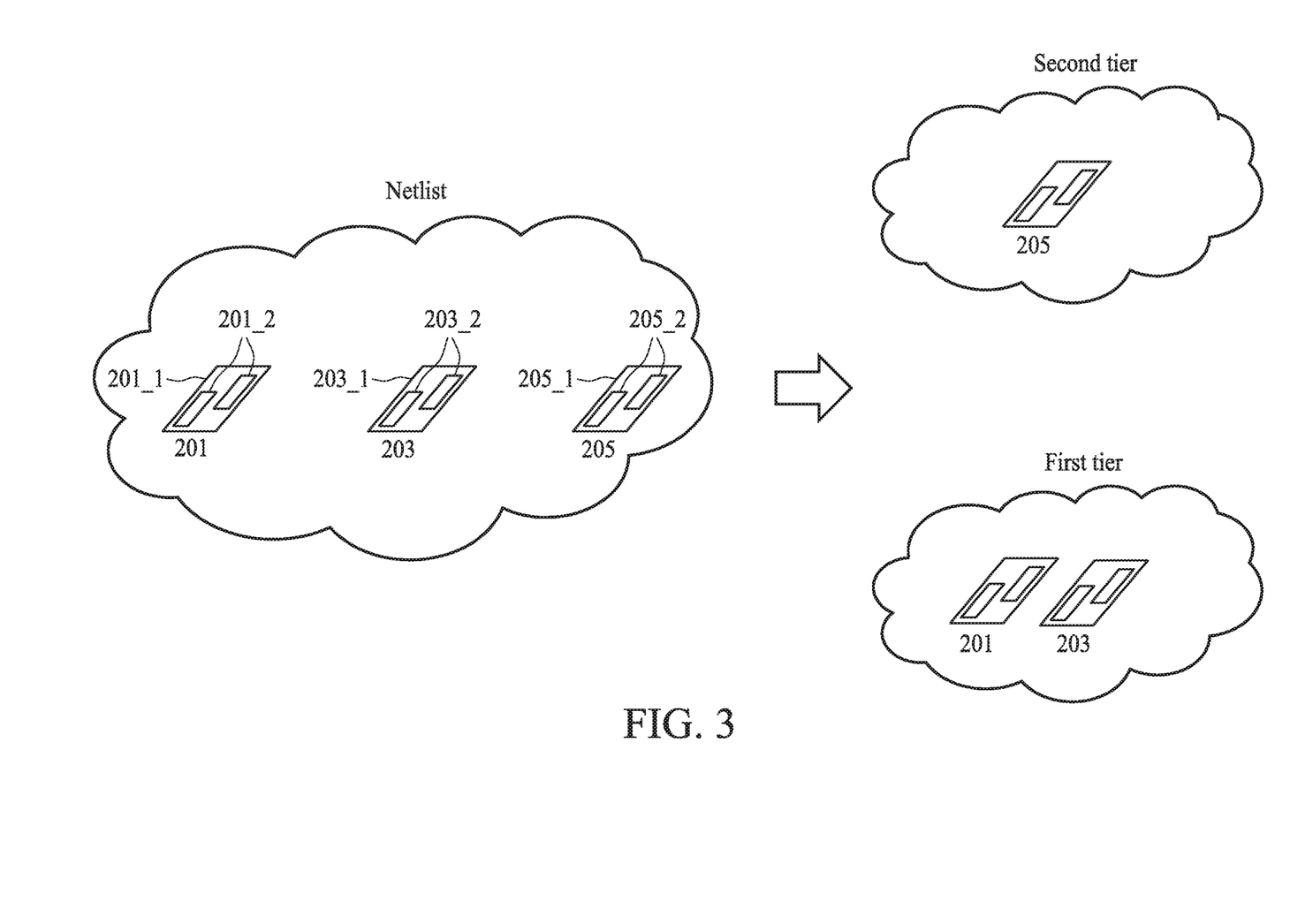
FIG. 3 is a diagram illustrating the operation of cell partitioning 103 of FIG. 2 according to an embodiment of the present disclosure.

FIG. 3 is a diagram illustrating the operation of cell partitioning 103 of FIG. 2 according to an embodiment of the present disclosure. As shown in FIG. 3, the netlist includes a plurality 2D cells 201, 203 and 205, for example. Each 2D cell includes a place-and-route boundary ("prBoundary") that defines a cell boundary. For example, the 2D cell 201 includes a prBoundary 201_1, the 2D cell 203 includes a prBoundary 203_1, and the 2D cell 205 includes a prBoundary 205_1. The cell boundary of each 2D cell is defined to avoid design rule violations when cells are abutted. Cell area is calculated according to the prBoundary. In addition, each 2D cell further includes a pin shape that can be coupled to the interconnect structure of the corresponding tier. For example, the 2D cell 201 includes a pin shape 201_2, the 2D cell 203 includes a pin shape 203_2, and the 2D cell 205 includes a pin shape 205_2. After the operation of cell partitioning 103, the 2D cells 201 and 203 may be allocated to a first tier; and the 2D cell 205 may be allocated to a second tier, for instance, above the first tier in the 3D technology having two tiers.

Figure 4:
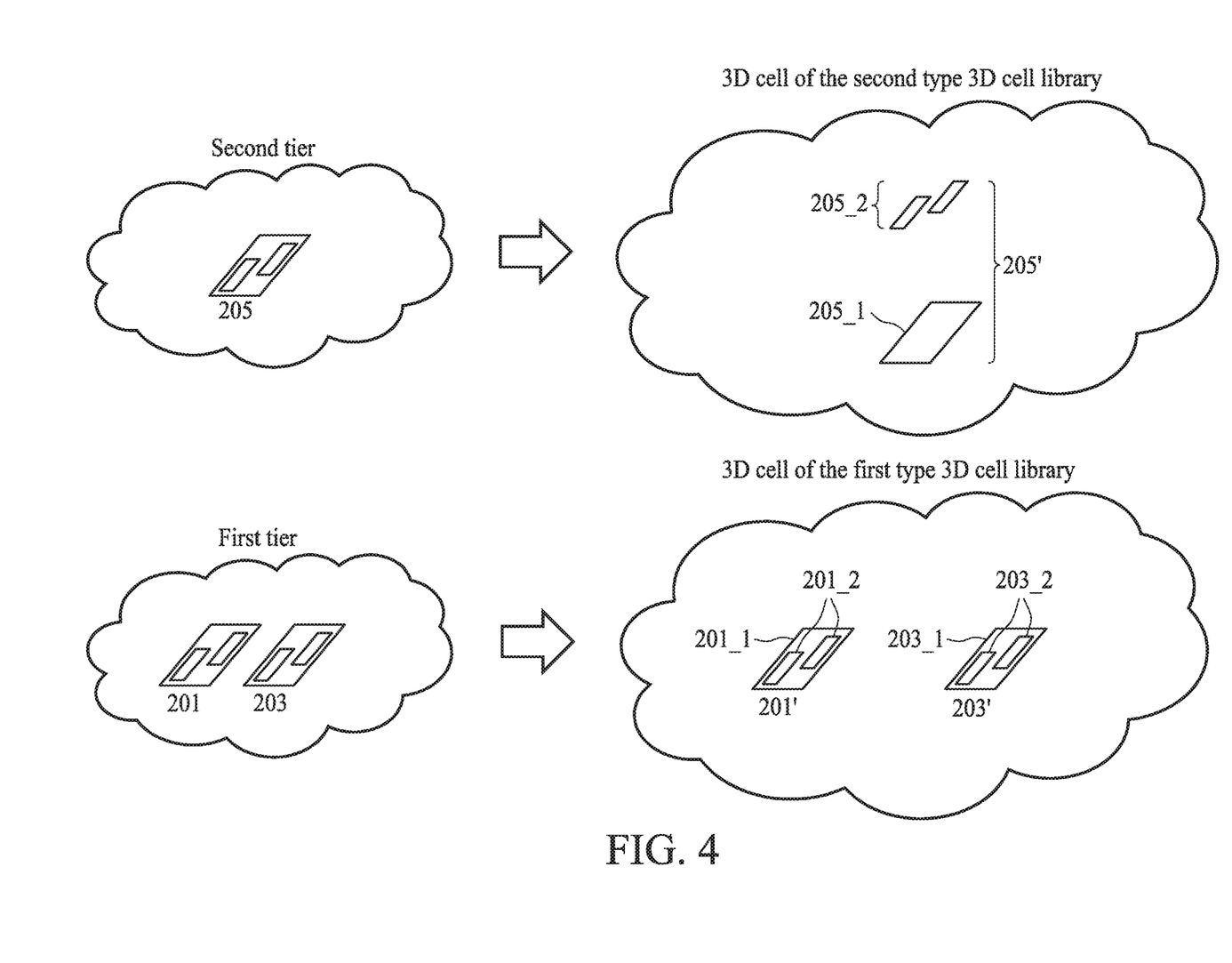
FIG. 4 is a diagram illustrating the operation of cell swapping 105 of FIG. 2 according to a first embodiment of the present disclosure.

Referring back to FIG. 2, the 2D cells 201 and 203 of the first tier are swapped with corresponding 3D cells of the first type 3D cell library 432b; and the 2D cell 205 of the second tier is swapped with a corresponding 3D cell of a second type 3D cell library 432c. FIG. 4 is a diagram illustrating the operation of cell swapping 105 of FIG. 2 according to a first embodiment of the present disclosure. As shown in FIG. 4, the 2D cells 201 and 203 assigned to the first tier are swapped with corresponding 3D cells 201' and 203' of the first type 3D cell library 432b; and the 2D cell 205 assigned to the second tier are swapped with a corresponding 3D cell 205' of the second type 3D cell library 432c. The 3D cells 201' and 203' of the first type 3D cell library 432b includes the information indicating the tier allocation is the first tier, and the 3D cell 205' of the second type 3D cell library 432c includes the information indicating the tier allocation is the second tier.

In the first embodiment, the prBoundary and the pin shape of the 3D cells of the first type 3D cell library 432b are configured to be placed in the first tier of the 3D IC. The prBoundary of the 3D cells of the second type 3D cell library 432c is configured to be in the first tier of the 3D IC, but the pin shape of the cell of the second type is configured to be in the second tier of the 3D IC. For example, the prBoundary 201_1 and the pin shape 201_2 of the 3D cell 201' and the prBoundary 203_1 and the pin shape 203_2 of the 3D cell 203' are in the first tier. The prBoundary 205_1 of the 3D cell 205' is in the first tier and the pin shape 205_2 of the 3D cell 205' is in the second tier.

Figure 5:
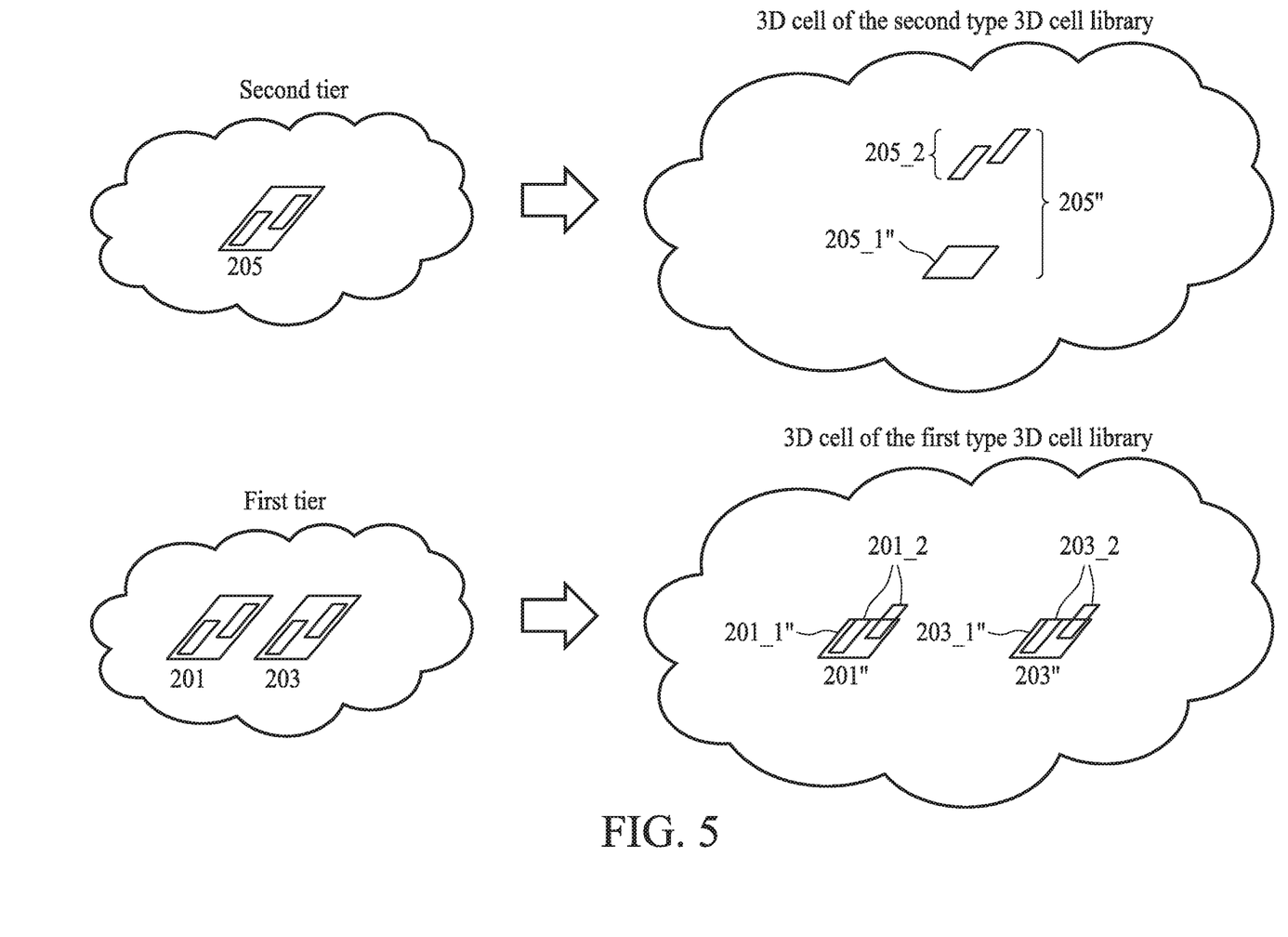
FIG. 5 is a diagram illustrating the operation of cell swapping 105 of FIG. 2 according to a second embodiment of the present disclosure.

FIG. 5 is a diagram illustrating the operation of cell swapping 105 of FIG. 2 according to a second embodiment of the present disclosure. As shown in FIG. 5, the 2D cells 201 and 203 assigned to the first tier are swapped with corresponding 3D cells 201" and 203" of the first type 3D cell library 432b; and the 2D cell 205 assigned to the second tier are swapped with a corresponding 3D cell 205" of the second type 3D cell library 432c.

In the second embodiment, the prBoundary of the 3D cells of the first type 3D cell library 432b shrink to half of the prBoundary of the corresponding 2D cells of the 2D cell library 432a. The prBoundary of the 3D cells of the second type 3D cell library 432c shrink to half of the prBoundary of the corresponding 2D cells of the 2D cell library 432a. In particular, the prBoundary of each 3D cell of the first type 3D cell library 432b combines the prBoundary of the corresponding 3D cell of the second type 3D cell library 432c can obtain the prBoundary of the corresponding 2D cell of the 2D cell library 432a. At the same time, the prBoundary of each 3D cell of the first type 3D cell library 432b does not overlap the prBoundary of the corresponding 3D cell of the second type 3D cell library 432c. A top view regarding the 2D to 3D cell swapping of the second embodiment is depicted in FIG. 6 and FIG. 7.

Figure 6:
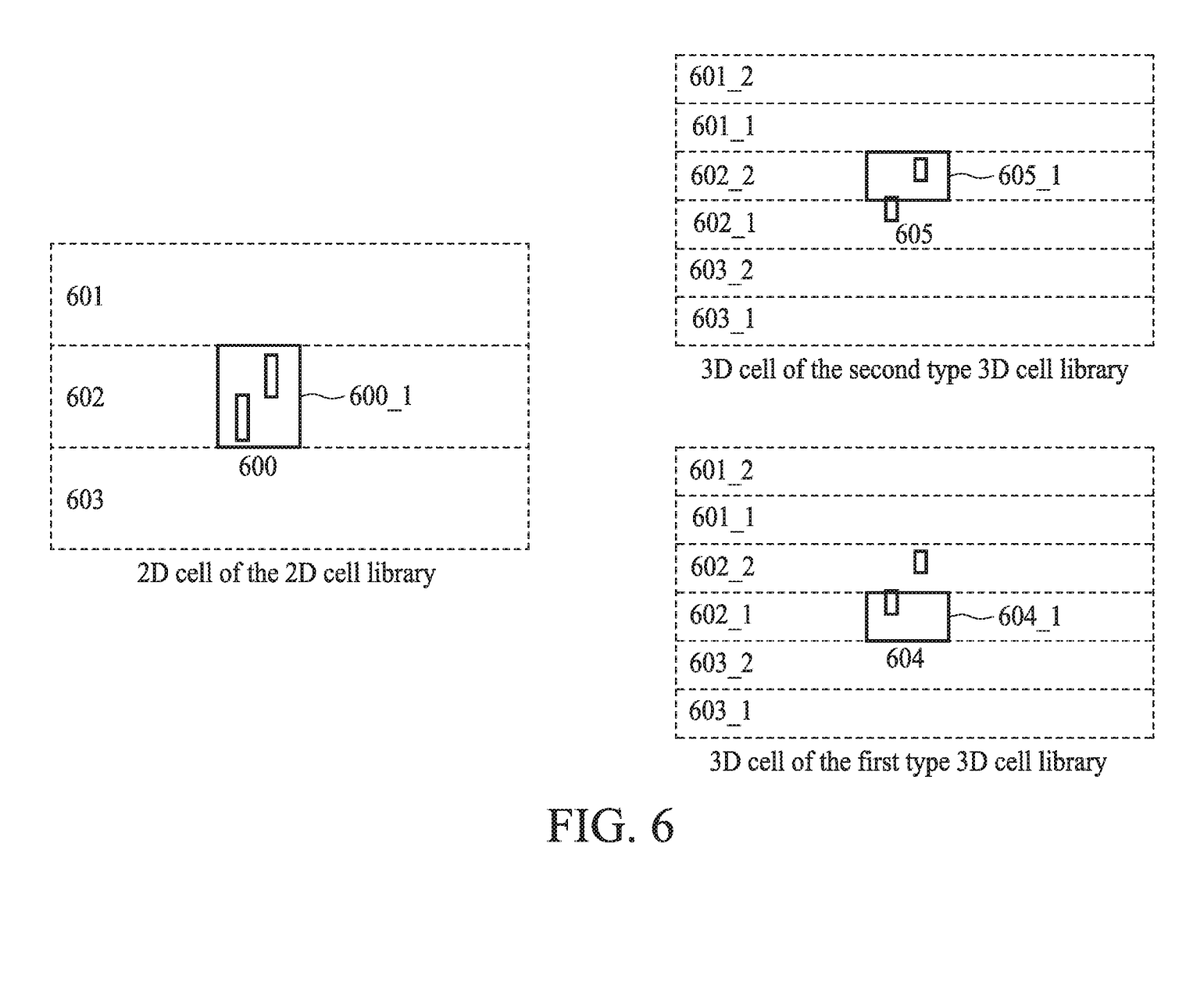
FIG. 6 is a diagram illustrating a top view of a 2D cell of the 2D call library and a corresponding 3D cell of the first type 3D cell library and a corresponding 3D cell of the second type 3D cell library according to the second embodiment of the present disclosure.

FIG. 6 is a diagram illustrating a top view of a 2D cell of the 2D cell library and a corresponding 3D cell of the first type 3D cell library and a corresponding 3D cell of the second type 3D cell library according to the second embodiment of the present disclosure. As shown in FIG. 6, an active area of a chip being divided into a plurality of rows 601 to 603, for example. A prBoundary 600_1 of a 2D cell 600 is placed at a row 602 between rows 601 and 603. A prBoundary 604_1 of a 3D cell 604 of the first type 3D cell library 432b corresponding to the 2D cell 600 is placed at a lower half 602_1 of the row 602 after 2D to 3D cell swapping (105). A prBoundary 605_1 of a 3D cell 605 of the second type 3D cell library 432c corresponding to the 2D cell 600 is placed at an upper half 602_2 of the row 602 after 2D to 3D cell swapping (105).

Figure 7:
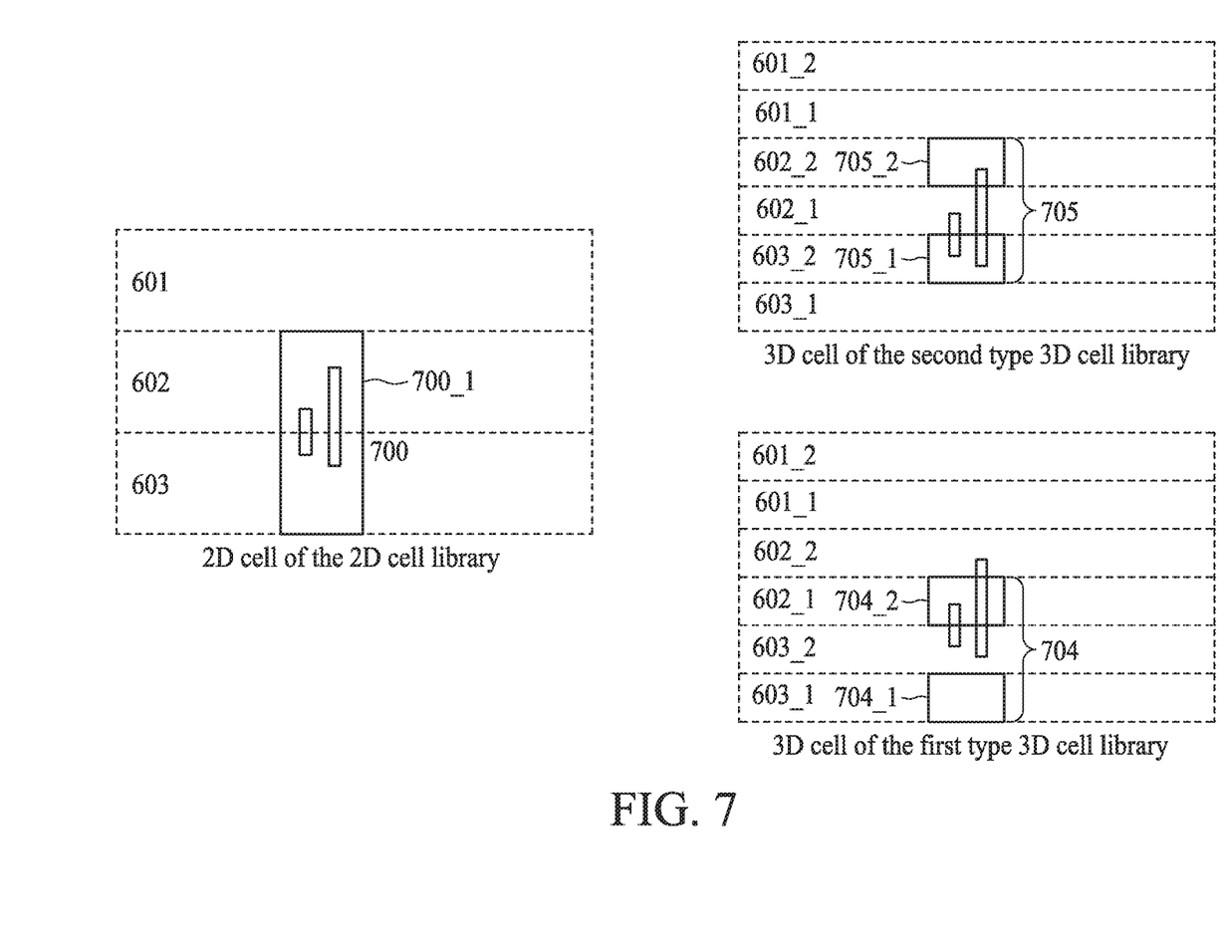
FIG. 7 is another diagram illustrating a top view of a 2D cell of the 2D cell library and a corresponding 3D cell of the first type 3D cell library and a corresponding 3D cell of the second type 3D cell library according to the second embodiment of the present disclosure.

FIG. 7 is another diagram illustrating a top view of a 2D cell of the 2D cell library and a corresponding 3D cell of the first type 3D cell library and a corresponding 3D cell of the second type 3D cell library according to the second embodiment of the present disclosure. As shown in FIG. 7, a prBoundary 700_1 of a 2D cell 700 has a height which is twice the height of the prBoundary 600_1 of the 2D cell 600 of FIG. 6. As such, the prBoundary 700_1 of the 2D cell 700 is placed across two rows 602 and 603, for example. A prBoundary of a 3D cell 704 of the first type 3D cell library 432b corresponding to the 2D cell 700 includes a lower prBoundary portion 704_1 and an upper prBoundary portion 704_2. The lower prBoundary portion 704_1 is placed at a lower half 603_1 of the row 603 and the upper prBoundary portion 704_2 is placed at a lower half 602_1 of the row 602 after 2D to 3D cell swapping (105). A prBoundary of a 3D cell 705 of the second type 3D cell library 432c corresponding to the 2D cell 700 includes a lower prBoundary portion 705_1 and an upper prBoundary portion 705_2. The lower prBoundary portion 705_1 is placed at an upper half 603_2 of the row 603 and the upper prBoundary portion 705_2 is placed at an upper half 602_2 of the row 602 after 2D to 3D cell swapping (105).

Referring back to FIG. 2, a global placement is performed (107) at least by the placer 422 of the processor 414 upon the 3D cells obtained from the 2D to 3D cell swapping (105). Global placement in certain embodiments provides a first-cut location for each 3D cell of the netlist. The first-cut location is subject to additional refinement by subsequent processing. Global placement is considered complete when a configuration is attained that is determined to be sufficiently close to legality to proceed with legalization, i.e. the configuration is likely to be reducible to a satisfactory implementation. If global placement results are acceptable (i.e. suitable as a starting point for further processing), then flow proceeds. During the global placement and the subsequent process, the 3D cells assigned to the first tier and the 3D cells assigned to the second tier can be handled at the same time.

Figure 8:
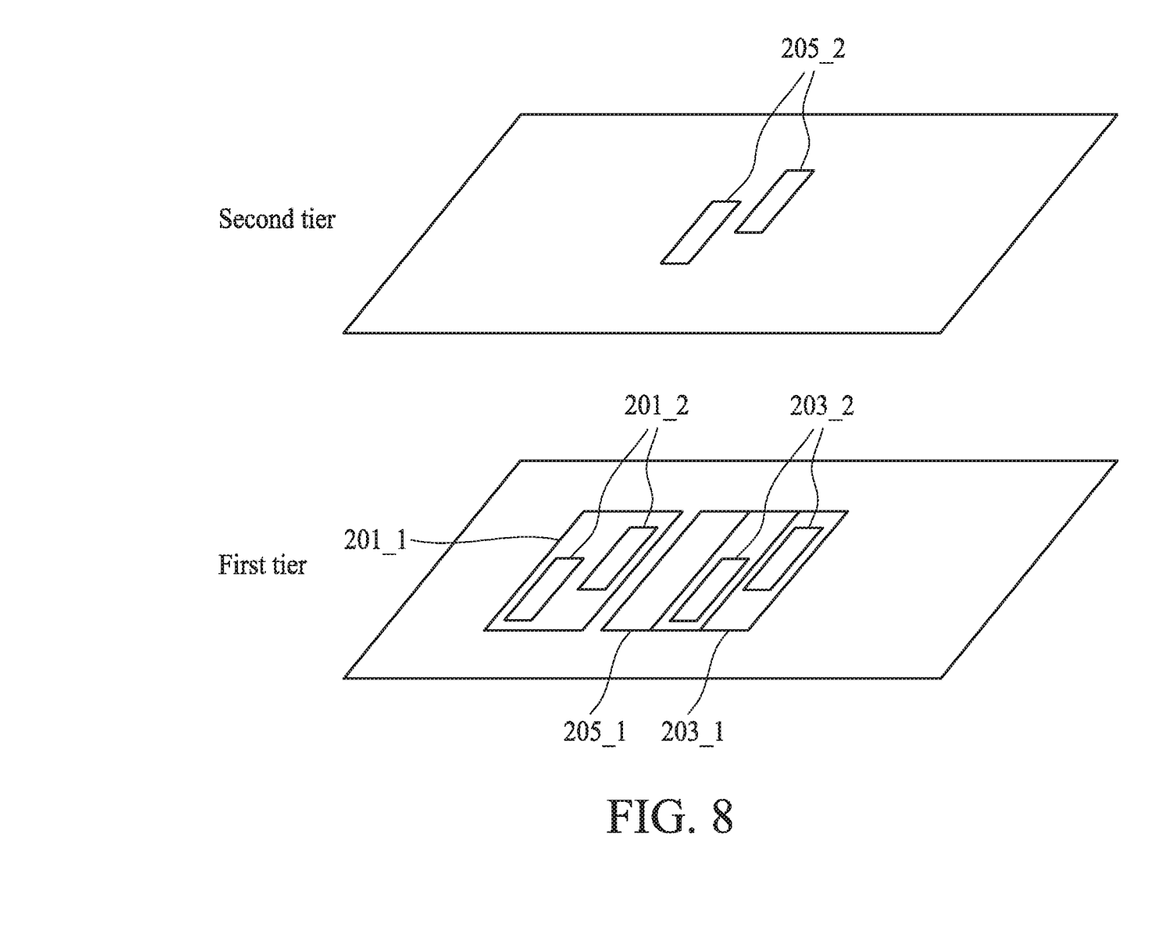
FIG. 8 is a diagram illustrating the operation of global placement 107 of FIG. 2 following the 2D to 3D cell swapping of FIG. 4 according to the first embodiment of the present disclosure.

According to the first embodiment of FIG. 4, the prBoundary of the 3D cell of the second type 3D cell library 432c is allowed to overlap the prBoundary of the 3D cell of the first type 3D cell library 432b because the 3D cells of the first type 3D cell library 432b includes the information indicating the tier allocation is the first tier, and the 3D cell of the second type 3D cell library 432c includes the information indicating the tier allocation is the second tier. FIG. 8 is a diagram illustrating the operation of global placement 107 of FIG. 2 following the 2D to 3D cell swapping of FIG. 4 according to the first embodiment of the present disclosure. As shown in FIG. 8, the prBoundary 201_1, 203_1 and 205_1 of the 3D cells 201', 203' and 205' are all placed at the first tier. During the global placement and the subsequent process, the prBoundary 201_1 of the 3D cell 201' is not allowed to overlap the prBoundary 203_1 of the 3D cell 203' or any other prBoundary of the 3D cell of the first type 3D cell library 432b. Similarly, the prBoundary 205_1 of the 3D cell 205' is not allowed to overlap any other prBoundary of the 3D cell of the second type 3D cell library 432c. However, the prBoundary 205_1 of the 3D cell 205' is allowed to overlap the prBoundary 201_1 or 203_1 of the 3D cells 201' or 203' or any other prBoundary of the 3D cell of the first type 3D cell library 432b.

Figure 9:
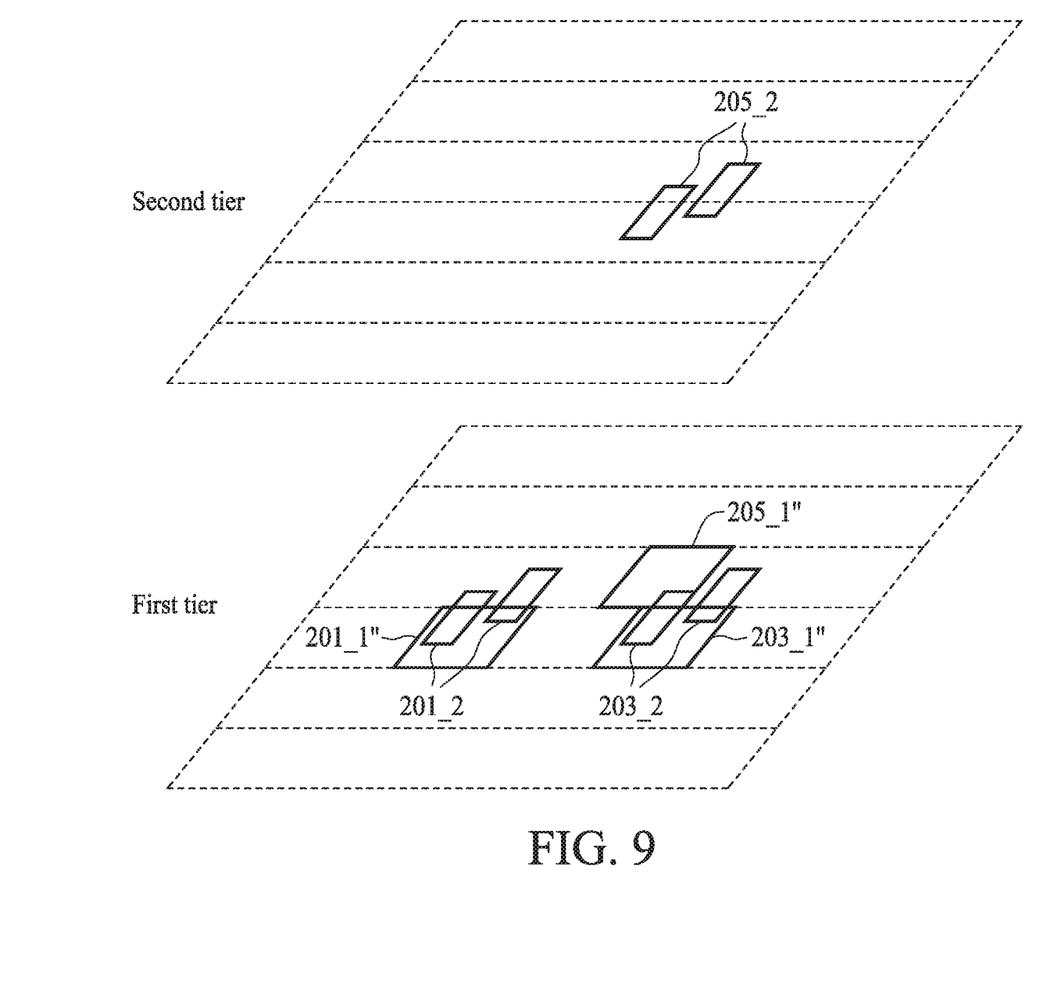
FIG. 9 is a diagram illustrating the operation of global placement 107 of FIG. 2 following the 2D to 3D cell swapping of FIG. 5 according to the second embodiment of the present disclosure.

According to the second embodiment of FIG. 5 to FIG. 7, the prBoundary of the 3D cell of the second type 3D cell library 432c can never overlap the prBoundary of the 3D cell of the first type 3D cell library 432b because the 3D cells of the first type 3D cell library 432b always only occupy the lower half of one or more rows, and the 3D cell of the second type 3D cell library 432c always only occupy the upper half of one or more rows. FIG. 9 is a diagram illustrating the operation of global placement 107 of FIG. 2 following the 2D to 3D cell swapping of FIG. 5 according to the second embodiment of the present disclosure. As shown in FIG. 9, the prBoundary 201_1", 203_1" and 205_1" of the 3D cells 201", 203" and 205" are all placed at the first tier. During the global placement and the subsequent process, the prBoundary 201_1 of the 3D cell 201" and the prBoundary 203_1 of the 3D cell and any other prBoundary of the 3D cell of the first type 3D cell library 432b are only allowed to be placed at the lower half of one or more rows. The prBoundary 205_1 of the 3D cell 205" and any other prBoundary of the 3D cell of the second type 3D cell library 432c are only allowed to be placed at the upper half of one or more rows. As such, the area estimated by the EDA tool 410 may be half of the real area and may be converted back at least by the processor 414.

In addition, during the global placement and the subsequent process, each 3D cell of the first type 3D cell library 432b may be swapped with a corresponding 3D cell of the second type 3D cell library 432c, and vice versa, in order to resolve the congestion issue or improve timing.

Subsequent to acceptable global placement, resources are reconciled according to the global placement and manufacturing information ("Legalization" 109), resulting in elimination of areas of oversubscribed resources. In certain embodiments modifications are made to the global placement results thus producing a legalized placement. If legalization results are acceptable, then flow proceeds with detailed placement (111) performed at least by the placer 422 of the processor 414 to make relatively small-scale adjustments to legalization results, via any combination of placed element movement and placed element implementation, according to embodiment. If detailed placement results are acceptable, then flow proceeds with a routing operation (113). The resultant 3D cells are wired together and corresponding interconnect is generated at least by the router 420 of the processor 414. If the routing results are acceptable, place and route processing is then complete ("End" 115), and results are available for further use, such as any combination of analysis and mask generation.

Some embodiments of the present disclosure provide a method. The method includes: obtaining a circuit design including a plurality of 2D cells of a 2D cell library; partitioning the plurality of 2D cells of the circuit design into a first group assigned to a first tier and a second group assigned to a second tier; swapping the 2D cells assigned to the first tier with corresponding 3D cells of a first type 3D cell library respectively; and swapping the 2D cells assigned to the second tier with corresponding 3D cells of a second type 3D cell library respectively; wherein at least one of the obtaining, partitioning, and swapping is performed using a processor.

Some embodiments of the present disclosure provide a method. The method includes: partitioning a plurality of 2D cells of a 2D cell library of a circuit design into a first group assigned to a first tier and a second group assigned to a second tier; swapping the 2D cells assigned to the first tier with corresponding 3D cells of a first type 3D cell library respectively, and swapping the 2D cells assigned to the second tier with corresponding 3D cells of a second type 3D cell library respectively; and performing global placement upon the corresponding 3D cells of the first type 3D cell library and the corresponding 3D cells of the second type 3D cell library at the same time and generating a global placement result; wherein at least one of the partitioning, swapping and performing is performed using a processor.

Some embodiments of the present disclosure provide a system. The system includes: a non-transient computer readable storage medium storing a circuit design, a 2D cell library, a first type 3D cell library and a second type 3D cell library; and a processor in signal communication with the non-transient computer readable storage medium, the processor configured to: obtaining the circuit design including a plurality of 2D cells of the 2D cell library from the non-transient computer readable storage medium; partitioning the plurality of 2D cells of the circuit design into a first group assigned to a first tier and a second group assigned to a second tier; swapping the 2D cells assigned to the first tier with corresponding 3D cells of the first type 3D cell library respectively; and swapping the 2D cells assigned to the second tier with corresponding 3D cells of the second type 3D cell library respectively.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
   obtaining a netlist of a circuit design including a plurality of 2D cells of a 2D cell library;
   partitioning the plurality of 2D cells of the circuit design into a first group assigned to a first tier and a second group assigned to a second tier;
   swapping the 2D cells assigned to the first tier with corresponding 3D cells of a first type 3D cell library respectively;
   swapping the 2D cells assigned to the second tier with corresponding 3D cells of a second type 3D cell library respectively; and
   performing global placement upon the corresponding 3D cells of the first type 3D cell library and the corresponding 3D cells of the second type 3D cell library at the same time, including:
      placing a prBoundary of each of the corresponding 3D cells of the first type 3D cell library at the first tier;
   wherein at least one of the obtaining, partitioning, and swapping is performed using a processor.

2. The method of claim 1, wherein each 3D cell of the first type 3D cell library includes information indicating tier allocation is the first tier, and each 3D cell of the second type 3D cell library includes information indicating tier allocation is the second tier.

3. The method of claim 2, wherein the performing the global placement upon the corresponding 3D cells of the first type 3D cell library and the corresponding 3D cells of the second type 3D cell library at the same time comprises:

performing the global placement upon the corresponding 3D cells of the first type 3D cell library and the corresponding 3D cells of the second type 3D cell library at the same time according to the information of each of the corresponding 3D cells of the first type 3D cell library and the information of each of the corresponding 3D cells of the second type 3D cell library.

4. The method of claim 3, wherein the performing the global placement upon the corresponding 3D cells of the first type 3D cell library and the corresponding 3D cells of the second type 3D cell library at the same time comprises:
placing a prBoundary of each of the corresponding 3D cells of the second type 3D cell library at the first tier.

5. The method of claim 4, wherein at least one of the prBoundary of each of the corresponding 3D cells of the first type 3D cell library overlaps at least one of the prBoundary of each of the corresponding 3D cells of the second type 3D cell library.

6. The method of claim 3, wherein the performing the global placement upon the corresponding 3D cells of the first type 3D cell library and the corresponding 3D cells of the second type 3D cell library at the same time comprises:
placing a pin shape of each of the corresponding 3D cells of the first type 3D cell library at the first tier; and
placing a pin shape of each of the corresponding 3D cells of the second type 3D cell library at the second tier.

7. The method of claim 1, wherein an area of a prBoundary of each of the 2D cells assigned to the first tier is twice the size of an area of a prBoundary of the corresponding 3D cell of the first type 3D cell library, and an area of a prBoundary of each of the 2D cells assigned to the second tier is twice the size of an area of a prBoundary of the corresponding 3D cell of the second type 3D cell library.

8. The method of claim 7, further comprising:
placing the prBoundary of each of the corresponding 3D cells of the first type 3D cell library at a lower half of a row of the first tier, and placing the prBoundary of each of the corresponding 3D cells of the second type 3D cell library at an upper half of a row of the first tier.

9. The method of claim 8, further comprising:
placing a pin shape of each of the corresponding 3D cells of the first type 3D cell library at the first tier; and
placing a pin shape of each of the corresponding 3D cells of the second type 3D cell library at the second tier.

10. A method, comprising:
partitioning a plurality of 2D cells of a 2D cell library of a netlist of a circuit design into a first group assigned to a first tier and a second group assigned to a second tier;
swapping the 2D cells assigned to the first tier with corresponding 3D cells of a first type 3D cell library respectively, and swapping the 2D cells assigned to the second tier with corresponding 3D cells of a second type 3D cell library respectively; and
performing global placement upon the corresponding 3D cells of the first type 3D cell library and the corresponding 3D cells of the second type 3D cell library at the same time and generating a global placement result;
wherein at least one of the partitioning, swapping and performing is performed using a processor; and
wherein the performing the global placement includes:
placing a prBoundary of each of the corresponding 3D cells of the first type 3D cell library at the first tier; and
placing a prBoundary of each of the corresponding 3D cells of the second type 3D cell library at the first tier.

11. The method of claim 10, wherein the performing the global placement upon the corresponding 3D cells of the first type 3D cell library and the corresponding 3D cells of the second type 3D cell library at the same time comprises:
swapping at least one of the corresponding 3D cells of the first type 3D cell library with a corresponding 3D cell of the second type 3D cell library.

12. The method of claim 10, further comprising:
performing legalization upon the global placement result and generating a legalization result.

13. The method of claim 12, wherein the performing the legalization upon the global placement result comprises:
swapping at least one 3D cell of the first type 3D cell library of the global placement result with a corresponding 3D cell of the second type 3D cell library.

14. The method of claim 12, further comprising:
performing detailed placement upon the legalization result and generating a detailed placement result.

15. The method of claim 14, further comprising:
performing routing upon the detailed placement result and generating a routing result.

16. A system, comprising:
a non-transient computer readable storage medium storing a netlist of a circuit design, a 2D cell library, a first type 3D cell library and a second type 3D cell library; and
a processor in signal communication with the non-transient computer readable storage medium, the processor configured to:
obtaining the netlist of the circuit design including a plurality of 2D cells of the 2D cell library from the non-transient computer readable storage medium;
partitioning the plurality of 2D cells of the netlist of the circuit design into a first group assigned to a first tier and a second group assigned to a second tier;
swapping the 2D cells assigned to the first tier with corresponding 3D cells of the first type 3D cell library respectively; and
swapping the 2D cells assigned to the second tier with corresponding 3D cells of the second type 3D cell library respectively; and
performing global placement upon the corresponding 3D cells of the first type 3D cell library and the corresponding 3D cells of the second type 3D cell library at the same time, including:
placing a pin shape of each of the corresponding 3D cells of the first type 3D cell library at the first tier; and
placing a pin shape of each of the corresponding 3D cells of the second type 3D cell library at the second tier.

17. The system of claim 16, wherein the performing the global placement upon the corresponding 3D cells of the first type 3D cell library and the corresponding 3D cells of the second type 3D cell library at the same time comprises:
performing the global placement upon the corresponding 3D cells of the first type 3D cell library and the corresponding 3D cells of the second type 3D cell library at the same time and generating a global placement result.

18. The system of claim 17, wherein the processor is further configured to:
performing legalization upon the global placement result and generating a legalization result.

19. The system of claim 16, wherein the performing the global placement upon the corresponding 3D cells of the first type 3D cell library and the corresponding 3D cells of the second type 3D cell library at the same time comprises:

placing a prBoundary of each of the corresponding 3D cells of the first type 3D cell library at the first tier; and placing a prBoundary of each of the corresponding 3D cells of the second type 3D cell library at the first tier.

20. The system of claim 16, wherein an area of a prBoundary of each of the 2D cells assigned to the first tier is twice the size of an area of a prBoundary of the corresponding 3D cell of the first type 3D cell library, and an area of a prBoundary of each of the 2D cells assigned to the second tier is twice the size of an area of a prBoundary of the corresponding 3D cell of the second type 3D cell library.

* * * * *